United States Patent [19]

Defranould et al.

[11] 4,122,495
[45] Oct. 24, 1978

[54] METHOD AND A DEVICE FOR AN ELECTRO-ACOUSTIC READING OF AN OPTICAL DEVICE IMAGE

[75] Inventors: Philippe Defranould; Charles Maerfeld, both of Paris, France

[73] Assignee: Thomson-CSF, Paris, France

[21] Appl. No.: 791,016

[22] Filed: Apr. 26, 1977

[30] Foreign Application Priority Data

Apr. 30, 1976 [FR] France .................. 76 13001

[51] Int. Cl.² .................. H04N 5/30; H04N 3/14
[52] U.S. Cl. .................. 358/213; 310/322
[58] Field of Search ............. 358/212, 213; 310/313, 310/322; 250/211 J, 211 R; 340/173 LS, 173 LT

[56] References Cited

U.S. PATENT DOCUMENTS 3,826,866   7/1974   Quate et al. .................. 358/213

Primary Examiner—Robert L. Richardson
Attorney, Agent, or Firm—Roland Plottel

[57] ABSTRACT

A method and a device for the one-dimensional analysis of an optical image and its conversion into an electrical signal, of which the amplitude characterizes the luminous intensity at each point. The device comprises, disposed opposite one another, a piezoelectric substrate and a semiconductive substrate onto which the image is projected. Reading is effected in two steps; the first step supplies a stationary distribution ($q$) of charges in the semiconductor by scanning the image by a non-linear interaction between two elastic waves; the second step, carried out after an integration time $\Delta t$ of the image gives a reading signal arising out of the non-linear interaction between a third elastic pulse and the charge distribution ($q$) as modified by the incident illumination during the time $\Delta t$.

9 Claims, 3 Drawing Figures

METHOD AND A DEVICE FOR AN ELECTRO-ACOUSTIC READING OF AN OPTICAL DEVICE IMAGE

This invention relates to a method and a device for reading an optical image using acoustic waves.

The reading of images by means of acoustic waves, also known as elastic waves, is generally effected by means of non-linear interactions between two electrical fields in a semiconductor, these electrical fields being the fields associated with the deformations of a piezoelectric crystal at the surface of which elastic waves propagated. The signal representing this interaction may be the electrical current which arises out of this interaction and which flows through the semiconductor. The image to be read is projected onto the semiconductor where, by spatially modulating the conductivity thereof, it modulates the intensity of the signal resulting from the non-linear interaction.

One of the parameters of these structures which attempts are currently being made to improve is their sensitivity. This is because the greater the sensitivity of an arrangement such as this, the more effectively the substantially non-luminous zones of an optical image and the small differences in luminosity are converted into an electrical output signal. This is of course necessary for a good analysis of the image.

The object of the present invention is considerably to increase this sensitivity by effecting reading in two separate steps.

According to the invention, there is provided a method for reading of an optical image by means of an electro-acoustic device, said device being of a type that comprises piezoelectric medium and a semiconductive and photosensitive medium coupled with the piezoelectric medium, said image being projected onto said semiconductive medium over an interaction surface and producing a modulation of conductivity therein by photo-electric effect, at least one first electromechanical transducer generating from electrical signals elastic waves propagated at the surface of the piezoelectric medium, and means for extracting an electrical output signal, said method comprising the following steps:

in the first step, a first interaction is produced between a first elastic wave occupying said interaction surface and a second wave having the same frequency, said first interaction producing a stationary and spatially periodic distribution of electrical charges representing said image;

in the second step, a second interaction is obtained between said charge distribution and a third elastic wave of which the frequency corresponds to the spatial periodicity of said charge distribution, said second interaction producing a spatially uniform electrical reading signal representing said charge distribution modulated by said image during the time separating the two phases, said reading signal constituting said output signal.

For a better understanding of the invention and to show how it may be carried into effect, reference will be made to the following description which is illustrated by the accompanying drawings, wherein.

Figure 3:
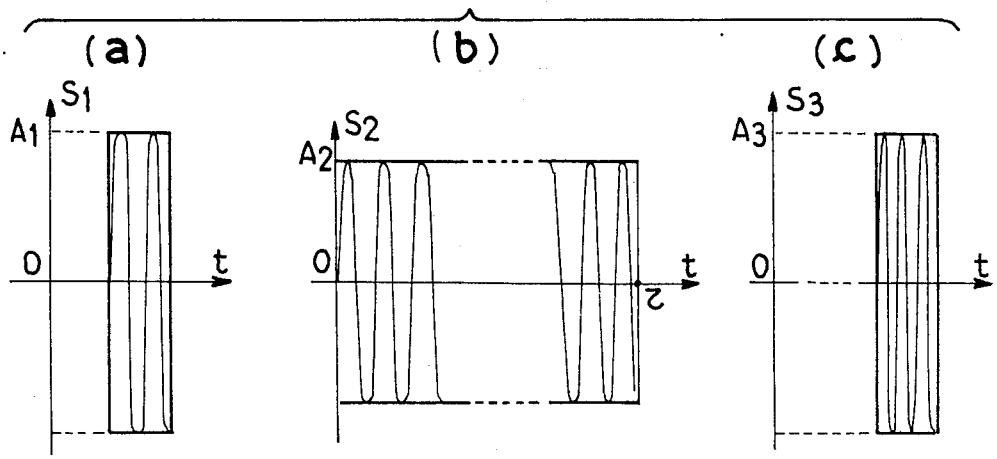

FIGS. 3a, b and c are diagrams of signals suitable for use in the method according to the invention.

In these various Figures, the same reference denote the same elements.

Figure 1:
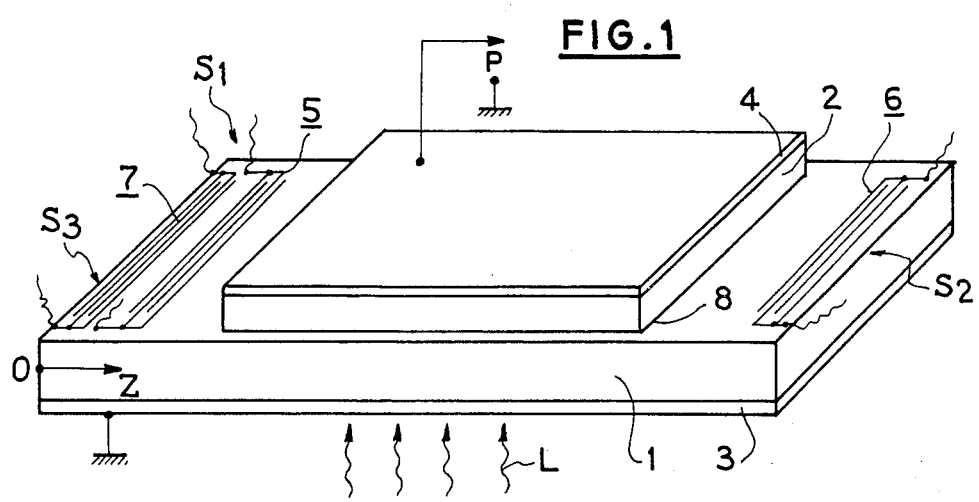
FIG. 1 is a diagrammatic view of one embodiment of the device according to the invention.

In the embodiment illustrated in FIG. 1, the device is formed by a piezoelectric substrate 1, for example of lithium niobate, and a semiconductive and photosensitive substrate 2 separated from one another by a thin air gap 8. These two substrates are in the form of plates elongated in a direction OZ which is the propagation direction of the elastic waves at the surface of the piezoelectric substrate 1. The substrate 2 is formed by a material selected in dependence upon the field of application of the device: silicon (N or P) or gallium arsenide is used for reading visible images, whilst mercury and cadmium telluride, lead and tin telluride or even indium antimonide is used for an infrared image.

The elastic waves are generated by means of electromechanical transducers of the type comprising comb shapped electrodes with alternate teeth, respectively 7 and 5 at one end of the substrate 1, and 6 at its other end.

The image to be read is projected onto the useful surface of the semiconductor 2, i.e. onto that surface which is opposite the upper surface of the piezoelectric substrate 1 where the elastic waves are propagated. These two surfaces are called "interaction surfaces" and define a zone called the "interaction zone". In the example illustrated in the FIG. 1, the image is projected (arrow L) onto the semiconductor 2 through the substrate 1. An arrangement such as this is common because the piezoelectric materials available are generally more transparent than the semiconductor materials and this is particularly the case with the materials mentioned above. The image L, which is one-dimensional, modulates the conductivity of the semiconductor in dependence upon its spatial light intensity distribution.

The device illustrated in FIG. 1 further comprises two planar electrodes 3 and 4 placed on the surfaces opposite the interaction surfaces of the substrates 1 and 2, respectively.

In operation, electrical signals $S_1$ and $S_2$ illustrated in FIGS. 3a and 3b are applied in a first step to the transducers 5 and 6, respectively.

The signal $S_2$ has a pulsation $\omega$ and a long duration $\tau$, at least equal to twice the time taken by the elastic wave to pass through the interaction zone. The transducer 6, to which the signal $S_2$ is applied, generates an elastic wave, also called $S_2$, in the direction $-\vec{Oz}$, of which the wave number is $k = \omega/v$, $v$ being the velocity of the elastic waves.

When the wave $S_2$ occupies the entire interaction zone, the pulse signal $S_1$ applied to the transducer 5 causes the generation of an elastic wave, also called $S_1$, propagated in the direction $\vec{Oz}$. This wave has the same pulsation $\omega$ as $S_2$ and a wave vector $\vec{k}$ equal and opposite to that of $S_2$.

As already known, the wave $S_1$ interacts non-linearly with the wave $S_2$ during its propagation in the direction $Oz$ and the interaction signal comprises two components:

one is characterised by a pulsation $\Omega'$ and a wave vector $\vec{K}'$ which are the sum of the pulsations and wave vectors of $S_1$ and $S_2$, i.e. $\Omega' = 2\omega$ and $K' = 0$;

the other is characterized by a pulsation $\Omega$ and a wave vector $K$ which are the difference between the pulsations and wave vectors, i.e. $\Omega = 0$ and $K = 2k$.

These two components each have an amplitude proportional to the product of the amplitudes $A_1$ and $A_2$ of the signals $S_1$ and $S_2$, the proportionality factor measuring the efficiency of the photosensitive substrate 2 and, at each point, the luminous intensity received at that point.

In the invention, it is the second of the components which is used, namely that which has a zero pulsation $\Omega$ and a wave number $K = 2k$, which corresponds to a stationary and spatially periodic charge distribution which is dependent upon the abscissa $z$ taken along the axis Oz and which is written as follows: $q(z) = Q(z) \cdot \cos 2kz$. In addition to what was said above, the value of the amplitude Q also depends upon the duration of the signal $S_1$ which in turn defines the elementary analysis zone of the image.

In a second reading step, an interaction is produced between the charge distribution $q(z)$ and an elastic pulse wave $S_3$ which supplies a reading signal P representing the distribution $q(z)$ and, hence, the incident image.

This elastic wave $S_3$ is generated for example from the same side as $S_1$ by the transducer 7 excited by an electrical signal, also called $S_3$, of which the shape may be that illustrated in FIG. 3c: a pulse of amplitude $A_3$ and pulsation $2\omega$. The corresponding elastic wave of pulsation $2\omega$ and wave number $2k$ interacts with the charge distribution $q(z)$ to supply, in particular, a signal of pulsation $2\omega$ and wave number zero, i.e. spatially uniform, which may be collected between the electrodes 3 and 4 to form the signal P.

Similarly to what has been said in the foregoing, the amplitude of the signal P is dependent in particular upon the product of the amplitudes $A_3$ and Q, i.e. it represents the sequential analysis of the charge distribution $q(z)$ during the scanning of the interaction zone by the pulse $S_3$. In addition, during the time $\Delta t$ separating the two reading steps, the amplitude $Q(z)$ of the charge distribution is modulated by photo-electric effect by the incident image because, at any point, it decreases with time, but in dependence upon the illumination received on that point. This discharge phenomenon, which is very slow in darkness, becomes increasingly more rapid when the luminous intensity increases. Accordingly, a negative reading of the image is obtained.

In other words, the time $\Delta t$ may be considered as an integration time of the image.

The resulting sensitivity of the structure is of course greater, the longer the interval $\Delta t$ between the two steps. However, this interval is limited by the desired reading rate of the optical image.

In the foregoing, it has been assumed that, between the two reading steps, the charge distribution $q(z)$ was only modified in dependence upon the illumination received and was maintained along the axis OZ as produced by the interaction of the waves $S_1$ and $S_2$. This necessitates the use of a semiconductor material having zero or minimal lateral conductivity. When the material used for forming the substrate 2 does not have this property, it is necessary to add to it a finite number of elements enabling this conductivity to be localised, such as PN or Schottky diodes or MOS (metal oxide semiconductor) or MIS (metal insulator semiconductor) structures, of which FIG. 2 shows one example.

Figure 2:
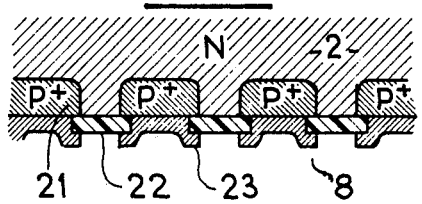
FIG. 2 is a fractional section through a variant embodiment of the device illustrated in FIG. 1.

FIG. 2 is a section, in the direction of the axis Oz, through a semiconductor substrate 2 on which PN diodes are formed.

The semiconductor substrate 2 is, for example, silicon of N-type conductivity. Diodes may be formed by the diffusion of P+ zones 21 in the substrate 2. Electrical contacts are formed by metallic deposits 23 in openings formed opposite the zones 21, in an insulating layer 22 (for example silica) covering the interaction surface of the semiconductor 2.

As mentioned above, diodes such as these avoid the loss of the information $q(z)$ by lateral electrical conductivity.

In addition, they have a direct effect upon the sensitivity of the structure through the intermediary of the depletion zones formed at the level of each junction. This is because the effects of the incident light are more noticeable in these depletion zones situated in the vicinity of the interaction surface, due to the fact that the creation of electron-hole pairs by the photons then takes place in a medium depleted of charge carriers.

By way of example, a structure corresponding to FIG. 2 was formed with a substrate 1 of lithium niobate (section YZ) and a substrate 2 of silicon with a resistivity of the order of 10 $\Omega$.cm. The diodes have a diameter of 5 $\mu$m with a periodicity of 12.5 $\mu$m. The air gap is approximately 0.2 $\mu$m thick. The signal $S_1$ is a pulse of duration equal to 0.2 $\mu$s, whilst the signal $S_2$ is a long signal with a duration of 10 $\mu$s, their frequency being 60 mc/s. The periodicity of the charge distribution is thus 30 $\mu$m. The decrease in $q(z)$ with time follows an exponential law and, by selecting a time $\Delta t = 3$ ms, there is obtained a variation in the amplitude Q corresponding to approximately 11.5 dB for a variation in illumination of 18 dB, wheras with structures of the prior art this amplitude variation was generally of the order of 3 dB for the same variation in illumination.

It should be noted that, for high luminous intensity values, the decrease in the amplitude Q during the time $\Delta t$ is rapid, so that these values may become lower than the noise of the structure if the value selected for $\Delta t$ is too great. This disadvantage may be reduced by increasing the values of Q obtained during the first phase. Since these values are proportional to the product of the amplitudes of the signals $S_1$ and $S_2$, the first step may be repeated several times for substantially improving the performances of the structure, in particular in cases where fairly low reading rates are acceptable.

In one variant (not shown) of the invention, it is possible to use a structure similar to that illustrated in FIGS. 1 and 2, but only comprising a single electromechanical transducer, for example the transducer 6. The reading of the image L is effected in two steps in the same way as before:

the first step consists in causing an elastic wave, such as $S_2$, generated by the transducer 6 to interact with an electromagnetic rather than elastic pulse $S'_1$ resulting from the application between the electrodes 3 and 4 of a pulse signal, such as $S_1$. In the same way as before, this gives an interaction signal of which one component is stationary (zero pulsation) and periodic (wave number equal to $k$). In this case, the charge distribution, with the preceding notations, is $q(z) = Q(z) \cdot \cos kz$;

the second step consists in reading the charge distribution $q(z)$ after an integration time $\Delta t$ of the image, by means of an elastic pulse wave of which the pulsation corresponds to the spatial periodicity of the distribution $q(z)$, i.e. of pulsation equal to $\omega$. This gives is collected between the electrodes 3 and 4 and which constitutes the image reading signal.

In one or other of the embodiments described above, the invention effects the one-dimensional analysis of an image. It is obvious that, by constructing a line-by-line scanning system, the invention is applicable to the reading of an optical image in two dimensions.

In another variant of the invention, the pulse signal $S_1$ may be replaced by a wave $S_4$ of long duration equal to at least the time taken by the elastic wave to pass through the interaction zone, this wave being linearly frequency-modulated. The signal $S_2$ remains the same as before. Thus, on completion of the first phase, there is obtained a stationary charge distribution of which the wave number varies linearly with the frequency along the interaction surface, the amplitude of the variation corresponding to the modulated frequency band.

During the second phase, an elastic wave identical to $S_4$ is used and a reading signal is obtained between the electrodes 3 and 4 which represents the Fourier transform of the projected image.

Signals which correspond respectively to an encoding and to a decoding may generally be used to remplace the signals $S_1$ and $S_3$ in order to obtain different signal treatments.

In another variant of the invention, it is also possible to use a signal $S_2$ which is amplitude-modulated to modulate the luminosity of the projected image. In this way, certain zones of the image can be made more luminous.

In another variant of the invention, to enable two waves of long duration to be used during the first step without an envelope of triangular form being obtained for the resultant signal, sufficiently high values are selected for the amplitudes $A_1$ and $A_2$ of the signals $S_1$ and $S_2$ for the interaction surface to be in a saturated charge state.

In another variant of the invention, it is possible to re-read the image in a third step similar to the second step, i.e. by interaction of the stationary and spatially periodic charge distribution obtained after the second step with an elastic pulse having the same wave number as said charge distribution. The effect of this is to have a second reading of which the sensitivity is better than the preceding reading.

Finally, it is possible to replace the two substrates 1 and 2, the one piezoelectric and the other semiconductive, by a single substrate which combines both properties, or even to replace the piezoelectric substrate by a thin piezoelectric layer (with a thickness of the order of a fraction of the elastic wavelength) deposited onto the semiconductive substrate.

What is claimed is:

1. A method for reading of an optical image by means of an electro-acoustic device, said device being of a type that comprises a piezoelectric medium and a semiconductive and photosensitive medium coupled with the piezoelectrid medium, said image being projected onto said semiconductive medium over an interaction surface and producing a modulation of conductivity therein by photo-electric effect, at least one first electromechanical transducer generating from electrical signals elastic waves propagated at the surface of the piezoelectric medium, and means for extracting an electrical output signal, said method comprising the following steps:

in the first step, a first interaction is produced between a first elastic wave occupying said interaction surface and a second wave having the same frequency, said first interaction producing a stationary and spatially periodic distribution of electrical charges representing said image;

in the second step, a second interaction is obtained between said charge distribution and a third elastic wave of which the frequency corresponds to the spatial periodicity of said charge distribution, said second interaction producing a spatially uniform electrical reading signal representing said charge distribution modulated by said image during the time separating the two phases, said reading signal constituting said output signal.

2. A method as claimed in claim 1, wherein said first wave has a duration at least equal to twice the time taken by an elastic wave to pass through the interaction surface, wherein said second wave is of pulse form and wherein said third wave is also of pulse form.

3. A method as claimed in claim 1, wherein said second wave is an elastic wave propagating on the interaction surface of the piezoelectric medium in the same direction as said first wave, but in the opposite sense, and wherein said third wave has a frequency which is twice that of the two preceding waves and is propagating on the interaction surface of the piezoelectric medium in the same direction as said first wave.

4. A method as claimed in claim 1, wherein said second wave is an electromagnetic wave, and wherein said third wave is generated at the same frequency as said first wave.

5. A method as claimed in claim 1, wherein said first wave has a duration at least equal to twice the time taken by an elastic wave to pass through the interaction surface, wherein said second wave is a long wave linearly modulated in frequency to a duration corresponding to said passage time, said reading signal representing the Fourier transform of said image.

6. A method as claimed in claim 1, wherein said second wave is amplitude-modulated.

7. A method as claimed in claim 1, wherein the amplitudes of said first and second waves are such that said interaction surface is in a saturated charge state.

8. A device for an electro-acoustic reading of an optical image, comprising a piezo-electric medium and a semiconductive and photosensitive medium coupled with the piezo-electric medium, said image being projected onto said semiconductive medium over an interaction surface and producing a modulation of conductivity therein by photo-electric effect, electromechanical transducer means for generating from electrical signals elastic waves propagated at the surface of the piezo-electric medium, and means for extracting an electrical output signal, said transducer means generating a first elastic wave which interacts with a second wave having the same frequency as the first wave, thus producing a stationary and spatially periodic distribution of electrical charges representing said image; said transducer means generating a third wave of which the frequency corresponds to the spatial periodicity of said distribution, for interacting with said distribution, thus producing a spatially uniform electrical reading signal, representing said distribution modulated by said image during the time separating the two said interactions, said reading signal constituting said output signal.

9. A device as claimed in claim 8, wherein said semiconductor medium is provided on said interaction surface with discrete junction elements.

* * * * *